United States Patent [19]

Swilley

[11] 4,221,021
[45] Sep. 9, 1980

[54] METHOD AND APPARATUS FOR ELECTRICAL STIMULATION OF AN ANIMAL CARCASS

[75] Inventor: Wilson H. Swilley, San Pablo, Calif.

[73] Assignee: LeFiell Company, San Francisco, Calif.

[21] Appl. No.: 43,792

[22] Filed: May 30, 1979

[51] Int. Cl.² .............................................. A22C 9/00
[52] U.S. Cl. ......................................... 17/45; 17/25; 17/1 E
[58] Field of Search .............................. 17/1 E, 25, 45

[56] References Cited

U.S. PATENT DOCUMENTS 2,806,246  9/1957  Simjian ................................. 17/45 X
3,828,397  8/1974  Harben, Jr. ......................... 17/1 E X Primary Examiner—Willie G. Abercrombie
Attorney, Agent, or Firm—Kinney & Schenk

[57] ABSTRACT

A method and apparatus for automatically electrically stimulating a series of carcasses in a production environment applies an electrical impulse to selective portions of an endless belt which are in contacting relationship with the carcass. The portions of the belt which come into contact with carcasses are sterilized prior to contacting subsequent carcasses. A plurality of impulses of predetermined duration are applied and these impulses are separated by periods of relaxation of predetermined duration.

11 Claims, 6 Drawing Figures

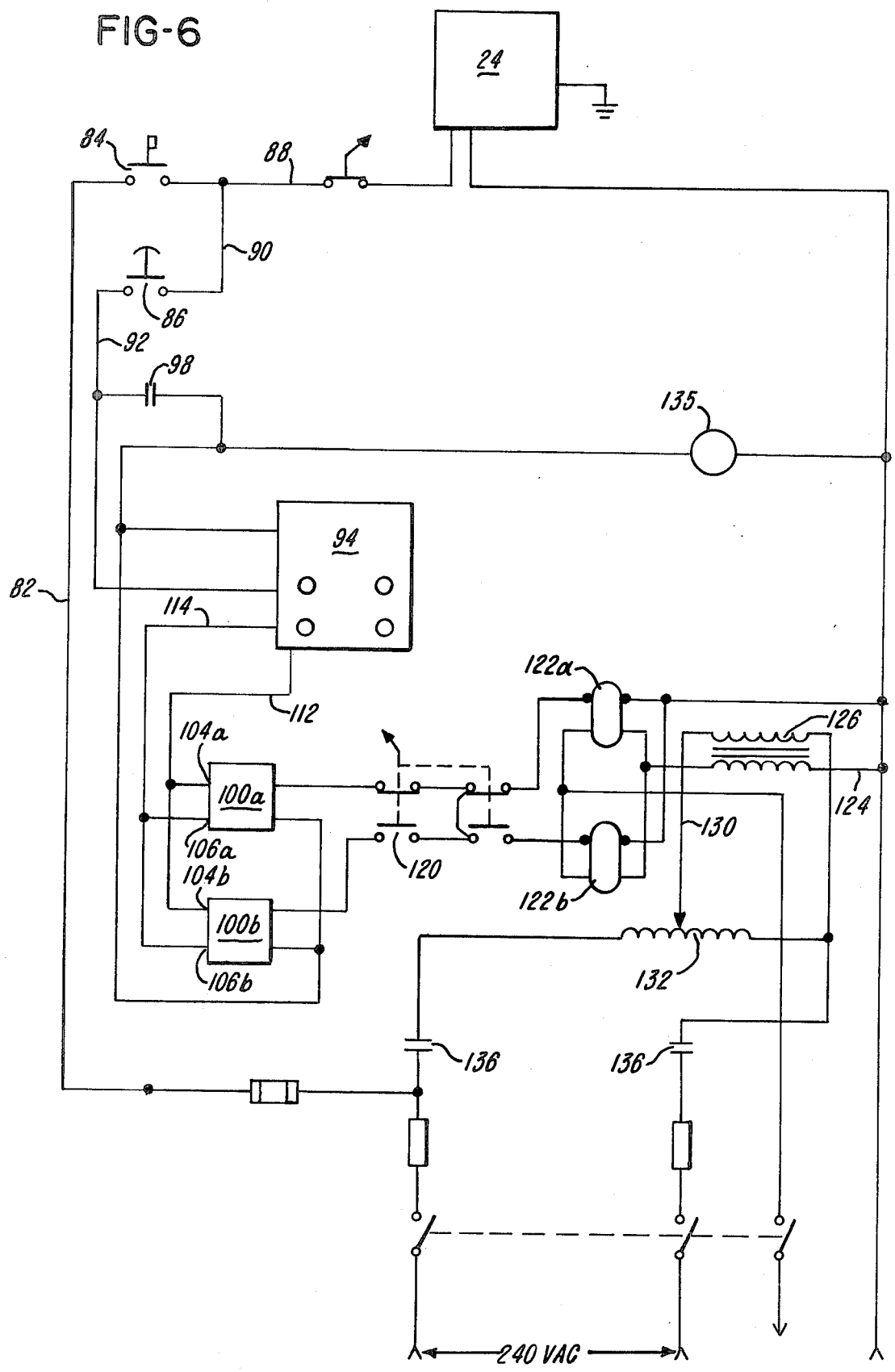

METHOD AND APPARATUS FOR ELECTRICAL STIMULATION OF AN ANIMAL CARCASS

BACKGROUND

The invention relates generally to tenderization of meat suitable for human consumption and more particularly concerns a method and apparatus for applying an electrical stimulation to an animal carcass. The invention will be disclosed by way of example in connection with a method and apparatus for applying a critically timed electrical pulse to a beef carcass.

Electrical stimulation is one of a variety of methods which have been used in the prior art to tenderize meat products. Most generally the prior art devices have applied an electrical charge to an animal carcass through a probe which was manually manipulated to contact the carcass as it passed on a rail mounted trolley. An example of such a probe and of the conventional method of applying an electrical stimulus to an animal carcass is disclosed in U.S. Pat. No. 2,544,861 to Harshan et al wherein electrodes on opposite sides of the carcass are sunk in each of the four legs and the neck of a carcass. Similarly, U.S. Pat. No. 2,544,724 discloses probes which are embedded in the carcass as it is passed over a trolley.

Insertion of a probe into an animal carcass generally requires a worker for placement of the probe and this worker is required to maintain contact as the carcass contorts under the impetus of the electrical energy. When the probe is inserted manually, care must also be taken to insure that the carcass does not jerk into the worker causing injury.

The disadvantages of having a worker manually insert or embed a probe into an animal carcass are obvious in a production environment. In addition to the labor cost necessitated by the required human operator, it was necessary to maintain a production line at a rate which was limited by the efficient working capabilities of the human operator. Further, when the carcass was to be used for human consumption it was necessary for the worker to sterilize each of the probes as they were pulled from one carcass and before they were inserted into the succeeding one in order to prevent any possible cross contamination of the meat. This added requirement put even further time restraints on the production line.

Applicant has discovered a new and novel method and apparatus for applying an electrical charge to an animal carcass in a production environment. This method and apparatus provides for automatic electrical stimulation of an animal carcass without any necessary intervention of a human operator. The invention also provides for sterilization of all components of the apparatus which come into contact with a particular carcass prior to subsequent contact with another carcass. Further, the invention provides for a series of electrical impulses of predetermined duration with an intervening series of relaxation periods.

Accordingly, it is a primary object of the present invention to provide a method and apparatus for applying an electrical stimulus to an animal carcass which is suitable for high volume production.

It is a further object of the present invention to provide a method and apparatus for applying an electrical stimulation to an animal carcass which prevents any possible cross contamination between carcasses.

It is a further object of the present invention to provide a method and apparatus for applying a plurality of successive electrical impulses to an animal carcass separated by predetermined periods for relaxation.

It is a further object of the present invention to provide a method and apparatus for applying an electrical stimulation to an animal carcass in which each element which comes into contact with an animal carcass is sterilized before contacting a successive carcass.

SUMMARY OF THE INVENTION

In accordance with the invention an apparatus with an endless belt supported upon a base and having segments with diverse electrical conductivity properties is continuously rotated through a predetermined working area into which electrical pulses are applied to the animal carcass. The animal carcass is moved into contacting relationship with the endless belt and move therewith through the working area. An electrical charge is applied to selected portions of the endless belt and this charge is applied to the animal carcass. Means are provided for passing those portions of the endless belt which contacted the animal carcass through a sterilization area prior to subsequent contact with a different carcass.

According to a further aspect of the invention, the electrical stimulization is applied to the carcass by a series of impulses having a duration of approximately two seconds. Each of these impulses is separated by a period of relaxation which has a duration of approximately one second.

BRIEF DESCRIPTION OF THE DRAWINGS

Other objects and advantages of the invention will become apparent upon reading the following detailed description and upon reference to the drawings, in which:

FIG. 6 is a schematic diagram of the electrical circuitry used on the apparatus of FIGS. 1-5.

While the invention will be described in connection with a preferred embodiment and procedure, it will be understood that it is not intended to limit the invention to that embodiment or procedure. On the contrary, it is intended to cover all alternatives, modifications, and equivalents as may be included within the spirit and scope of the invention is defined by the appended claims.

DETAILED DESCRIPTION OF THE PREFERRED EMBODIMENT

Figure 1:
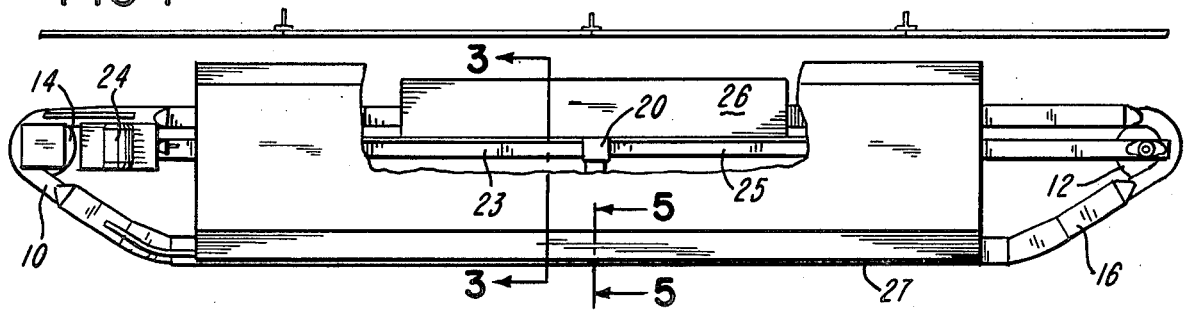
FIG. 1 is a plan view of an embodiment of the present invention used to apply an electrical impulse to an animal carcass with details omitted for clarity of illustration.
Figure 2:
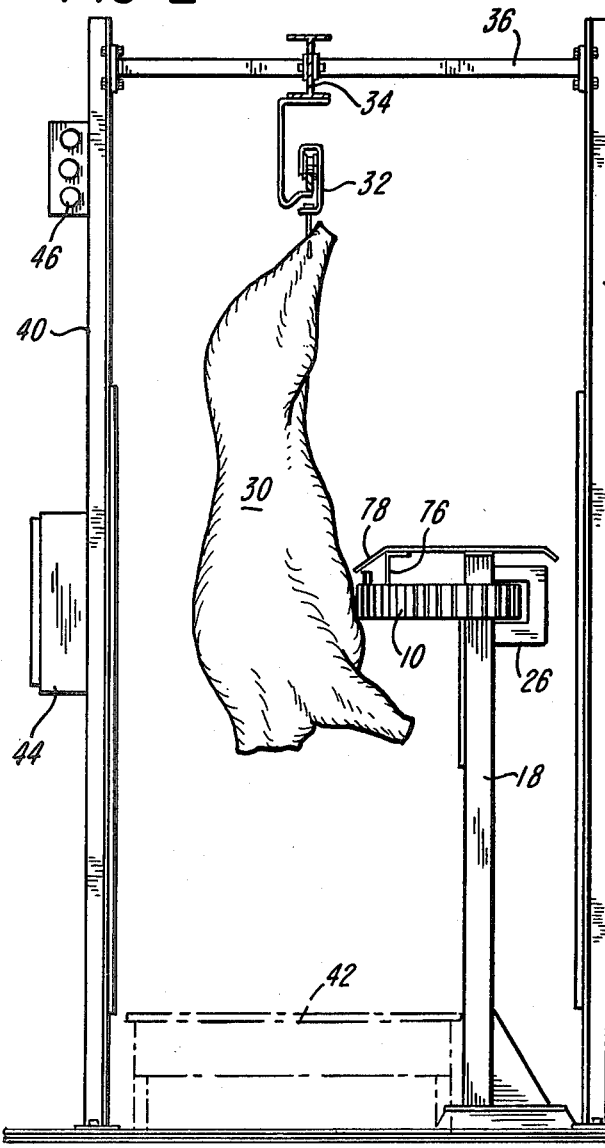
FIG. 2 is a side elevational view of the apparatus of FIG. 1 with details omitted for clarity of illustration.

Referring now to the drawings and to FIG. 1 in particular, an endless belt 10 depicted in plan view is rotatably supported by a plastic drive sprocket 14 and an idler sprocket 12. A plastic slide plate 16 is supported in cantilevered fashion and extends horizontally outward from three support posts 18, 20, and 22 (post 18 is shown in FIG. 2) to slidably engage and guide the inner surface of endless belt 10. The support posts 18, 20, and 22 are jointed by support posts 23 and 25. The endless belt 10 is continuously rotated about both sprockets 12 and 14 under the impetus of a motor 24 which transmits power to the drive sprocket 14 through a suitable gear reduction unit (not shown). The endless belt 10 moves clockwise (from the vantage point of FIG. 1) and a particular segment of it would move from the drive sprocket 14 through a sterilization area defined by a sterilization cabinet 26, around idler sprocket 12 and through a work or impulse area 27 which runs in substantially parallel relationship to a track centerline 28. As will be seen below, track centerline 28 identifies the path of an animal carcass which is transported upon a track or rail.

FIG. 2 shows an end view of the apparatus of FIG. 1 and depicts a beef carcass 30 in touching relationship with the endless belt 10. The carcass 30 is suspended from a trolley 32 slidably supported by a rail 34. The rail 34 forms a track for transporting the carcass 30 along the track centerline 28, the track centerline 28 being substantially parallel to the work or impulse area of the endless belt 10 where the carcass receives an electrical stimulation. The rail 34 is supported by a plurality of horizontal support tubes 36 (only one of which is shown in FIG. 2). The horizontal supports are in turn supported by a plurality of vertical supports 40 which are rigidly connected to each extremity of the horizontal supports. A standard control panel 44 and a plurality of warning lights 46 are also supported upon the vertical supports 40, lights 46 being on each ends of the apparatus.

A blood catch bath 42 is optionally positioned beneath the carcass 30 to collect blood which may drip from the carcass 30 as it travels along rail 34 on the path identified by line 28.

Figure 3:
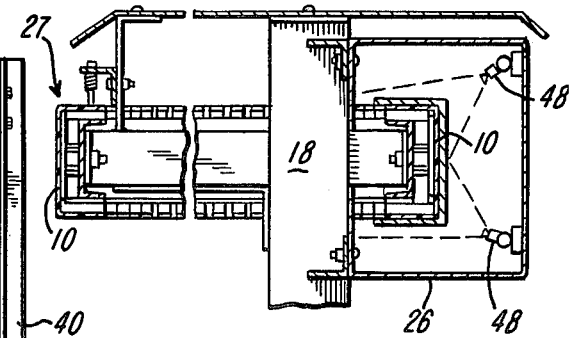
FIG. 3 is a cross sectional elevational view of the apparatus of FIG. 1 taken along line 3—3.

As seen in the depiction of FIG. 3, the sterilization cabinet 26 contains a plurality of spray nozzles 48 which direct a sterilization agent (most preferably high temperature water or steam) onto the portion of the endless belt 10 contained within the sterilization cabinet 26. The nozzles 48 are mounted on the side walls of the cabinet 26 and direct the sterilization agent onto the endless belt 10 along the cabinets 26 entire length. FIG. 3 also shows the work or impulse portion 27, with details omitted, on the left hand side of the illustration.

Figure 4:
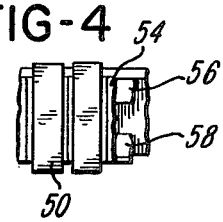
FIG. 4 is a front elevational view of the chain conveyor utilized on the apparatus of FIG. 1 depicting the conveyor in greater detail.

As seen in the illustration of FIG. 4, the belt 10 is segmented. It has a plurality of uniformly spaced form metal strips or flights 50 mounted on a plastic chain 54. The metal strips 50 and 52 have relatively high electrical conductive properties and are electrically isolated from each other by the plastic material which has a relatively low electrical conductivity, the metal strips being conductors and the plastic chain being an insulator. Plastic wear strips 56 and 58 run transversely to the metal flights in the direction of the movement of endless belt 10 to slidingly contact the plastic chain 54 on the chain's inner surface. The wear strips serve as a wear surface and the plastic material insures electrical insulation between the metal flights 50.

Figure 5:
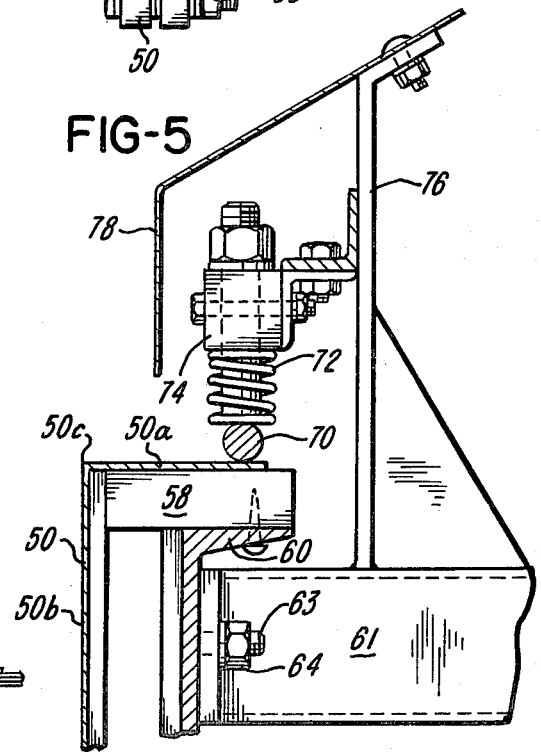
FIG. 5 is an enlarged sectional view taken along line 5—5 in FIG. 1 and illustrating the current rod and conveyor in greater detail and the relationship therebetween.

The work or impulse area of endless belt 10, which was shown on the extreme left side of the depiction of FIG. 3, is also shown in FIG. 5 with greater detail. As illustrated in this depiction, steel flights 50 (only one flight 50 is shown) have an L-shape with horizontal surfaces 50a and vertical surfaces 50b interfaced at a corner 50c. Although not shown on the drawings, the steel flights 50 are attached to the flights of the plastic chains 54 through the horizontal surfaces 50a by suitable fastening means, as for example bolts.

A channel 60 is securely fastened by a bolt 63 and nut 64 to a horizontal support 61. The horizontal support in turn extends outwardly from vertical support 20 as shown in FIG. 1. Returning once again to FIG. 5, it is seen that an insulation strip 58 rests on a top portion of the channel 60 and is held thereto by screws 62. Another insulation strip 57 covers a vertical sidewall of the channel 60 and abuts insulation strip 58. The insulation strip 58 is fastened to a sidewall of channel 60 by the bolt and nut combination 63 and 64 which also secures the channel 60 to the horizontal support 61.

The horizontal surface 50a of metal flight 50 is sandwiched between the insulation strip 58 and a current rod 70 (which extends in a direction perpendicular to the plane defined by the sheet of the illustration) biased downwardly against the horizontal surface 50a. The current rod 70 extends only through the impulse area 27. A spring 72 is used to bias the current rod 70 in this manner. The spring 72 is adjustably mounted in a holder 74 supported in cantilevered fashion on a vertical support 76 which in turn rests upon the horizontal support 61. The holder 74 is shown protected by a sheet metal shield 78 which is also supported by the vertical support 76.

Each of the surfaces 50a and 50b of metal flight 50 as well as flight 54 of the plastic chain to which the vertical metal flight surface 50b is firmly attached, move relative to the other elements illustrated. The direction of this relative movement is perpendicular to the plane defined by the sheet of the illustration.

A schematic illustration of an electrical circuit used with the apparatus of FIGS. 1-5 is shown in FIG. 6. A 110 volt power source is applied to the circuit through a main power line 82 to an on-off switch 84. Switch 84 connects the power to the adjustable speed motor 24 (also shown in FIG. 1) and also to a second switch 86 through lines 88 and 90 respectively. As will be recalled, the motor 24 transmits power to the drive sprocket 14 to drive endless belt 10. The switch 86 is an on-off switch which connects line 90 to line 92 to apply the 110 volt power source to a logic sequencer 94 when the switch 86 is in the closed position.

Line 96, which branches off line 92 and also supplies 110 volt power to the logic sequencer 94 through a pair of normally open auxiliary contacts 98 which are located on the conveyor or endless belt 10. The contacts 98 are closed whenever the conveyor or endless belt 10 is operated.

The logic sequencer 94 is a variable duration timer and may be any of several partially available types (as for example the CARD-LOCK models currently available from the Allen Bradley Company of Milwaukee, Wisconsin). The logic sequencer 94 applies a 5 volt d.c. electrical impulse of variable duration to a pair of solid state relays 100a and 100b at respective imputs 104a, 106a, 104b, and 106b, the impulse to imputs 104a and 104b being applied from the logic sequencer 94 through line 112 and the impulse to imputs 106a and 106b being applied from the logic sequencer 94 through line 114. Whenever the logic sequencer 94 applies its impulse to imputs 104a and 104b, the relays 100a and 100b are energized to electrically connect the 110 volt power of line 114 with lines 116a and 116b, the line 114 carrying the 110 volt power supply from line 96 whenever the contacts 98 are closed by the conveyor operation.

Depending upon the position of a selector switch 120, either relay output 116a will be applied to agasta mercury relay 112a or relay output 116b will be applied to agasta mercury relay 112b. Activation of either of the mercury relays 112a or 112b will energize a ground leg 124 of a 10 KVA transformer 126 including a transformer output leg 128 which produces an output voltage of approximately 700 volts. The transformer 126 receives an imput on imput leg 130 from a variable imput 132 connected to the power supply by a pair of normally open contacts 136 which are closed by the operation of endless belt 10 through the activation of coil 135. The transformer output let 128 thus applies a stepped up impulse voltage of between approximately 500 and 700 volts to the current rod 70 (which was shown in FIG. 5).

As will be appreciated by those skilled in the art, the electrical circuitry depicted in FIG. 6 steps up a low voltage output of approximately 5 volts d.c. which is output from the logic sequencer 94 and input to the solid state relays 100a and 100b to a 110 volt output which is output from these solid state relays 100a or 100b. The output of one of these solid state relays is then stepped up via the agasta mercury relays which are mercury damped for high voltage in order to prevent arcing, to a high voltage of approximately 700 volts which is then applied to the current rod 70. It will also be appreciated that solid state relay 100b and agasta mercury relay 122b and their corresponding connections are redundant over those of solid state relay 100a and agasta mercury relay 122a. One of the two systems is used as a backup or spare circuit.

In operation, the endless belt 10 is continuously rotated clockwise as viewed in FIG. 1. A trolley carrying an animal carcass 30 is transported along track centerline 28 in the direction of arrow 28a. As the carcass approaches the work or impulse area 27 of belt 10, it contacts a plurality of space metal flights 50. The spaced metal flights 50 in the impulse area are in sliding contact with the current rod 70 and thus conduct the high level electrical impulse from the rod through the flights and to the ground through the animal carcass 30. Each of the individual metal flights 50 is, however, electrically insulated from the other metal flights by the insulating plastic. The only flights 50 which receive the impulse are those in sliding contact with the rod 70 which is limited to the impulse area 27. The disparity in electrical conductivity between the metal and the plastic thus limits the electrical impulse to the flights in contact with the current rod.

The muscles in the carcass 30 are contracted by the electrical impulse. It has been found that the best results are obtained when a voltage of approximately 650 volts (a.c.) is intermittently applied to the carcass causing it to contract and contort. These intermediate electrical pulses should be spaced by periods of relaxation. Applicant has found that the pulse should be applied for approximately two seconds with relaxation periods of approximately one second between each pulse.

Trolley 32 carries the carcass 30 in the direction defined by arrow 28 in a substantially parallel relationship to the impulse area of endless belt 10. Further, the belt 10 and carcass 30 are moved at the same speed. Consequently, the group of metal flights which initially contact a particular carcass as the impulse area will remain in contact with that same carcass through the residence time of the belt and the carcass in the stimulation or impulse area.

Referring once again to FIG. 1, it is seen that as a carcass and that group of metal flights in contact therewith leave the stimulation area, that group of metal flights continue movement around drive sprocket 14 and through the sterilization cabinet 26 before returning once against to the sterilization area for subsequent contact with a different carcass. It is thus seen that a group of flights come into contact with only one carcass before being sterilized, eliminating the possibility of cross contamination from one carcass to another.

The electrical stimulation of the carcass expends the latent energy in the muscles, nerves, and tissues. Consequently when cooled rapidly as is desirable for quality control, the muscles will not shorten and the toughness that results from this shortening will be prevented.

Additionally, the process of electrical stimulation causes a conversion of sugar molecules present in the muscle tissue to lactic acid. The same process occurs in living tissue but the acid is carried away in the blood stream while the animal is living. Lactic acid conversion releases certain enzymes which promote tenderness. Thus, electrical stimulation produces a rapid acceleration of the natural meat tenderization by its own enzymes.

The stimulus of electrical pulsation when applied in the applicants method will also drop the PH level of a beef carcass from 7.1 to 5.6 within one and one-half hours as compared to approximately 24 hours in other conventional methods, and this rapid decline in PH will accelerate the ageing process.

Thus it is apparent that there has been provided, in accordance with the invention, a method and apparatus which fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. An apparatus for applying electrical energy to a carcass of an animal, comprising:
   (a) a base;
   (b) an endless belt supported upon said base and having segments with diverse electrical conductivity properties;
   (c) means for continuously moving said endless belt relative to said base through a predetermined working area;
   (d) means for movingly supporting an animal carcass and contacting relationship with said endless belt in said predetermined working area;
   (e) means for applying electrical energy to selective segments of said endless belt in said predetermined area.

2. An apparatus as recited in claim 1 further including a sterilization area distal to said predetermined working area, said endless belt being continuously moved through said sterilization area subsequent to moving through said predetermined working area.

3. An apparatus as recited in claim 1 wherein said endless belt is formed of a material having a relatively low electrical conductivity with material of a relatively high conductivity selectively spaced along said endless belt.

4. An apparatus as recited in claim 3 wherein said electrical energy applying means includes a conduction rod, said selectively spaced material of relatively high conductivity being in sliding engagement with said rod in said predetermined working area.

5. An apparatus as recited in claim 1 wherein said supporting means includes a trolley from which said carcass is suspended and a rail for movingly supporting said trolley.

6. An apparatus as recited in claim 2 wherein said sterilization area includes a plurality of spray nozzles for directing a sterilization agent upon said endless belt.

7. A method of electrically stimulating an animal carcass, comprising:
 (a) rotating an endless belt having a plurality of segments of electrical conductors separated by electrical insulators;
 (b) applying an electrical charge to selected segments of electrical conductors; and
 (c) contacting the selected segments with an animal carcass and passing the electrical charge applied to selected segments through the animal carcass.

8. A method as recited in claim 7 wherein said contacting step includes transporting the animal carcass in a direction substantially parallel to movement of the endless belt at a predetermined location at substantially the same speed as the belt and in contacting relationship therewith, and wherein said selected segments are in said predetermined location.

9. A method as recited in claim 8 further including sterilizing the endless belt at a second predetermined location through which the belt passes after traveling through said predetermined location.

10. A method as recited in claim 9 wherein said electrical charge is a series of impulses having a magnitude between 500 and 700 volts and having a duration of approximately two seconds to repeatedly contract muscles in the carcass, and where each impulse is separated by a period of relaxation, each relaxation period having a duration of approximately one second.

11. A method of tenderizing an animal carcass by electrical stimulation, comprising:
 (a) applying a series of electrical impulses to an animal carcass, each of the impulses having a magnitude between 500 and 700 volts and having a duration of approximately two seconds to repeatedly contract muscles in the carcass; and
 (b) separating each of the impulses by a period of relaxation, each relaxation period having a duration of approximately one second.

* * * * *